US012772035B2

(12) United States Patent
Suh

(10) Patent No.: US 12,772,035 B2
(45) Date of Patent: Oct. 20, 2026

(54) METHOD AND APPARATUS FOR SUPPORTING MOBILITY OF TERMINAL IN WIRELESS COMMUNICATION SYSTEM

(71) Applicant: Samsung Electronics Co., Ltd., Suwon-si (KR)

(72) Inventor: Kyungjoo Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 18/355,203

(22) Filed: Jul. 19, 2023

(65) Prior Publication Data

US 2024/0031789 A1 Jan. 25, 2024

(30) Foreign Application Priority Data

Jul. 22, 2022 (KR) ........................ 10-2022-0091286

(51) Int. Cl.
*H04W 8/06* (2009.01)
*H04W 60/00* (2009.01)

(52) U.S. Cl.
CPC ............. *H04W 8/06* (2013.01); *H04W 60/00* (2013.01)

(58) Field of Classification Search
CPC ....... H04W 8/06; H04W 60/00; H04W 48/18; H04W 60/04; H04W 8/02; H04W 84/042
See application file for complete search history.

(56) References Cited

U.S. PATENT DOCUMENTS

| | | | | |
|---|---|---|---|---|
| 10,779,230 | B1 * | 9/2020 | Sethi | H04W 60/04 |
| 2018/0199160 | A1 | 7/2018 | Edge | |
| 2021/0051466 | A1 | 2/2021 | Kumar et al. | |
| 2021/0136715 | A1 | 5/2021 | Jeong et al. | |
| 2022/0330006 | A1 * | 10/2022 | Zhu | H04W 68/00 |
| 2023/0022888 | A1 | 1/2023 | Kim et al. | |
| 2024/0349179 | A1 * | 10/2024 | Starsinic | H04W 48/16 |

FOREIGN PATENT DOCUMENTS

| | | | |
|---|---|---|---|
| CN | 113709764 | A | 11/2021 |
| WO | 2021241905 | A1 | 12/2021 |

OTHER PUBLICATIONS

International Search Report and Written Opinion of the International Searching Authority dated Oct. 23, 2023, in connection with International Application No. PCT/KR2023/009688, 8 pages.

China Mobile, "The requirement of AMF to provide "CAG information list" for the current PLMN in the Registration Reject message," C1-204724, 3GPP TSG-CT WG1 Meeting #124-e, Electronic meeting, Jun. 2-10, 2020, 12 pages.

* cited by examiner

*Primary Examiner* — Mazda Sabouri

(57) ABSTRACT

The disclosure relates to a 5G or 6G communication system for supporting a higher data transmission rate. The disclosure provides a method, an apparatus, and a system for supporting mobility of a terminal.

20 Claims, 8 Drawing Sheets

METHOD AND APPARATUS FOR SUPPORTING MOBILITY OF TERMINAL IN WIRELESS COMMUNICATION SYSTEM

CROSS-REFERENCE TO RELATED APPLICATION

This application is based on and claims priority under 35 U.S.C. § 119 to Korean Patent Application No. 10-2022-0091286, filed on Jul. 22, 2022, in the Korean Intellectual Property Office, the disclosure of which is incorporated by reference herein in its entirety.

BACKGROUND

1. Field

The disclosure relates to a method, an apparatus and/or a system for supporting mobility of a terminal a mobile communication system. Particularly, the disclosure relates to the method and the apparatus for supporting the terminal mobility using non-access stratum (NAS) in the mobile communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources. As the communication system recently advances, it is required to improve a procedure for supporting mobility of a terminal in relation to terminal roaming.

SUMMARY

The disclosure is to address a problem in which a network does not support a network slice and/or a service for a terminal, if there is an available network slice for terminal movement (e.g., terminal roaming) or a terminal requiring a network slice in a corresponding region but a public land mobile network (PLMN) selected first as a serving PLMN does not support the corresponding network slice or service. Also, the disclosure relates to a method and an apparatus for supporting a network slice and/or a service for a terminal in a network.

According to an embodiment of the disclosure, a method performed by a terminal is provided. The method comprises: transmitting, to a first access and mobility management function (AMF) entity of a first visited public land mobile network (VPLMN), a first registration request message including information on a network slice for a service; receiving, from the first AMF entity of the first VPLMN, a registration reject message including at least one of information on an available network slice, information on an available VPLMN for the available network slice, or information on a priority of the available VPLMN; transmitting, to a second AMF entity of a second VPLMN, a second registration request message, wherein the second VPLMN is one of the available VPLMN; and receiving, from the second AMF entity of the second VPLMN, a registration accept message as a response to the second registration request message.

According to an embodiment of the disclosure, a method performed by a first access and mobility management function (AMF) entity of a first visited public land mobile network (VPLMN) is provided. The method comprises: receiving, from a terminal, a first registration request message including information on a network slice for a service; and transmitting, to the terminal, a registration reject message including at least one of information on an available network slice, information on an available VPLMN for the available network slice, or information on a priority of the available VPLMN, wherein a second registration request message is transmitted to a second AMF entity of a second VPLMN which is one of the available VPLMN, based on the registration reject message.

According to an embodiment of the disclosure, a terminal is provided. The terminal comprises: a transceiver; and a controller coupled with the transceiver and configured to: transmit, to a first access and mobility management function (AMF) entity of a first visited public land mobile network (VPLMN), a first registration request message including information on a network slice for a service, receive, from the first AMF entity of the first VPLMN, a registration reject message including at least one of information on an available network slice, information on an available VPLMN for the available network slice, or information on a priority of the available VPLMN, transmit, to a second AMF entity of a second VPLMN, a second registration request message, wherein the second VPLMN is one of the available VPLMN, and receive, from the second AMF entity of the second VPLMN, a registration accept message as a response to the second registration request message.

According to an embodiment of the disclosure, a first AMF entity of a first VPLMN is provided. The first AMF entity comprises: a transceiver; and a controller coupled with the transceiver and configured to: receive, from a terminal, a first registration request message including information on a network slice for a service, and transmit, to the terminal, a registration reject message including at least one of information on an available network slice, information on an available VPLMN for the available network slice, or information on a priority of the available VPLMN, wherein a second registration request message is transmitted to a second AMF entity of a second VPLMN which is one of the available VPLMN, based on the registration reject message.

According to an embodiment of the disclosure, a mobile communication system (or a wireless communication system) may support a network slice related service, or efficiently support various services even in movement or roaming of a terminal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
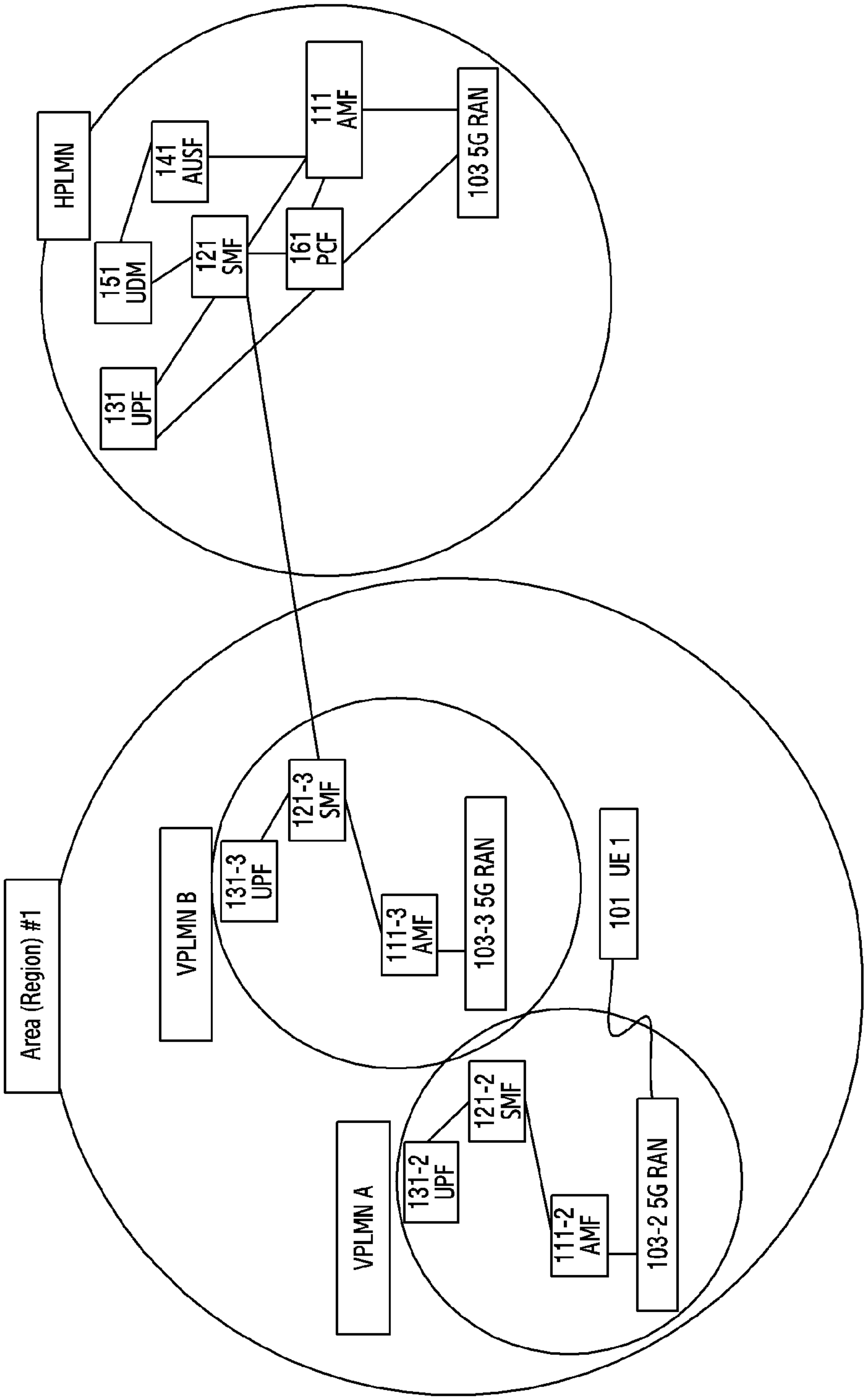
FIG. 1 illustrates an example of a moving or roaming terminal and a network environment, in relation to an embodiment of the disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure are described in detail with reference to the accompanying drawings. In this case, it is noted that like reference numerals denote like elements in the accompanying drawings. In addition, detailed descriptions on well-known functions or configurations which may obscure the subject matter of the disclosure shall be omitted.

Hereinafter, the embodiments of the disclosure are described in detail with reference to the accompanying drawings. In describing the embodiments, technical contents well known in the technical field to which the disclosure pertains and which are not directly related to the disclosure will be omitted in the specification. This is to more clearly provide the subject matter of the disclosure by omitting unnecessary descriptions without obscuring the subject matter of the disclosure.

For the same reason, some components in the accompanying drawings are exaggerated, omitted, or schematically illustrated. Also, a size of each component does not entirely reflect an actual size. The same reference number is given to the same or corresponding element in each drawing.

Advantages and features of the disclosure, and methods for achieving them will be clarified with reference to embodiments described below in detail together with the accompanying drawings. However, the disclosure is not limited to the embodiments disclosed below but may be implemented in various different forms, the embodiments are provided only to complete the scope of the disclosure and to allow those skilled in the art to which the disclosure pertains to fully understand a category of the disclosure, and the disclosure is solely defined within the scope of the claims. The same reference numeral refers to the same element throughout the specification.

At this time, it will be understood that each block of the process flowchart illustrations and combinations of the flowchart illustrations may be executed by computer program instructions. In addition, each block may represent a portion of a module, a segment or code which includes one or more executable instructions for implementing a specified logical function(s). Also, it should be noted that the functions mentioned in the blocks may occur out of order in some alternative implementations. For example, two blocks shown in succession may in fact be executed substantially concurrently or the blocks may sometimes be executed in the reverse order depending on corresponding functionality.

At this time, the term '~unit' as used in the present embodiment indicates software or a hardware component such as a field programmable gate array (FPGA) or an application-specific integrated circuit (ASIC), and '~unit' performs specific roles. However, '~unit' is not limited to software or hardware. '~unit' may be configured to reside on an addressable storage medium and configured to reproduce on one or more processors. Accordingly, '~unit' may include, for example, components such as software components, object-oriented software components, class components and task components, processes, functions, attributes, procedures, sub-routines, segments of program code, drivers, firmware, microcode, circuitry, data, databases, data structures, tables, arrays, and variables. The functionalities provided in the components and '~unit' may be combined to fewer components and '~units' or may be further separated into additional components and '~units'. Further, the components and '~units' may be implemented to reproduce one or more central processing units (CPUs) within a device or a security multimedia card. Also, '~unit' in one embodiment may include one or more processors.

Hereafter, terms for identifying access nodes, terms indicating network entities, terms indicating messages, terms indicating interfaces between network entities, terms indicating various identification information, and the like are illustratively used in the description for the sake of convenience. Accordingly, the disclosure is not limited by the terms as used, and other terms indicating subjects having equivalent technical meanings may be used.

For convenience of description, the disclosure may use terms and names defined in 3rd generation partnership project (3GPP) long term evolution (LTE) standard and new radio (NR) standard, or terms and names modified based on them. However, the disclosure is not limited to the terms and the names, and may be equally applied to systems complying with other standards. In the disclosure, an evolved node B (eNB) may be used together with a next generation node B (gNB) for convenience of description. That is, a base station described as the eNB may represent the gNB. In the disclosure, a terminal may indicate not only a user equipment (UE), a mobile phone, narrowband (NB)-internet of things (IoT) devices, and sensors, but also various wireless communication devices.

That is, detailed description of embodiments of the disclosure are mainly based on the communication standards defined by the 3GPP, but the main subject of the disclosure may be applied to other communication systems having a similar technical background by making slight changes therein without departing from the scope of the disclosure, as determined by those skilled in the technical field of the disclosure.

In the 5G or NR system, an access and mobility management function (AMF) which is a management entity for managing mobility of a terminal, and a session management function (SMF) which is an entity for managing a session are separated. Unlike a 4G LTE communication system in which a mobility management entity (MME) performs both the mobility management and the session management, the 5G or NR system separates the mobility management entity and the session management entity and accordingly a communication method and a communication management method change between the terminal and the network entity.

A network of the 5G or NR system performs the mobility management through the AMF via a non-3GPP interworking function (N3IWF), and performs the session management performed through the SMF, with respect to a non-3GPP access. Also, the AMF may process security related information which is an important factor in the mobility management.

Meanwhile, as described above, in the 4G LTE system, the MME performs both the mobility the management and the session management. The 5G or NR system may support a non-standalone (NSA) architecture for performing the communication by using the network entity of the 4G LTE system together.

Meanwhile, if a terminal is moving, particularly, if the terminal is roaming, the network selects a serving public land mobile network (PLMN) by first considering a radio signal strength, and supports the terminal via the corresponding serving PLMN, despite an available network slice in an area of the terminal. Hence, despite another PLMN for providing the network slice in the area of the terminal, the network does not select the PLMN for providing the network slice to support the terminal and thus may not support a network slice related service for the terminal in the area of the terminal.

Hereafter, if the moving (e.g., roaming) terminal requires the network slice and there is an available network slice in the area of the terminal, the network selects (or determines) the PLMN by considering a network slice service for supporting the PLMN in selecting the serving PLMN or determining a priority of the serving PLMN. In the terminal roaming, by selecting the PLMN or determining the priority of the PLMN by considering the network slice, it is possible to address the problem that the selected serving PLMN does not support the network slice or service required by the terminal and does not support the network slice related service. In connection with the aforementioned procedure, the following describes a solution for the network to efficiently support a network slice and/or service for the terminal.

FIG. 1 is a diagram illustrating an example of a moving or roaming terminal and a network environment, in relation to an embodiment of the disclosure.

Referring to FIG. 1, a 5G or NR core network may include a plurality of network functions (NFs) (or entities) including user plane functions (UPFs) 131, 131-2, and 131-3, SMFs 121, 121-2, and 121-3, AMFs 111, 111-2, and 111-3, 5G radio access networks (RANs) 103, 103-2, and 103-3, a user data management (UDM) 151, and a policy control function (PCF) 161. In addition, the 5G or NR core network may include entities such as an authentication server function (AUFS) 141 and an authentication, authorization and accounting (AAA), to authenticate those entities. A terminal or UE 101 may access the 5G core network via a base station or the 5G RAN 103, 103-2 and 103-3.

The 5G or NR core network (hereafter, the network) includes an N3IWF for the UE to communicate via the non-3GPP access. If the UE communicates via the non-3GPP access, the terminal session management is performed through the UE, the non-3GPP access, the N3IWF, and the SMF and the terminal mobility management is performed through the UE, the non-3GPP access, the N3IWF, and the AMF.

As mentioned above, the 5G or NR system divides the mobility management entity and the session management entity into the AMF 111, 111-2 and 111-3 and the SMF 121, 121-2 and 121-3. Meanwhile, the 5G or NR system considers both a stand-alone (SA) deployment structure which performs the communication only with the 5G or NR entities and an NSA deployment structure which performs the communication with the 4G entities and the 5G or NR entities together.

As shown in FIG. 1, the UE may consider a deployment structure communicating with the 5G entity of the core network, under control of the eNB and the gNB (the 5G RAN 103, 103-2 and 103-3). In this case, the mobility management between the UE and the AMF and the session management between the UE and the SMF may be performed in a non-access stratum (NAS) layer which is a layer 3.

The disclosure assumes the communication network as the 5G (or NR) or the 4G (or LTE) network, but it is noted that the disclosure may be applied as it is, if the same concept is adopted in other system within the category which may be understood by those of ordinary skill in the art.

Referring to FIG. 1, it is assumed that the UE 101 roams and migrates from a home PLMN (HPLMN) to a visited PLMN (VPLMN) of an area or region #1.

The UE 101 roaming from a specific PLMN (e.g., the HPLMN) to another PLMN (e.g., the VPLMN) may select the VPLMN (a VPLMN A or a VPLMN B in FIG. 1). The selected VPLMN serves the UE 101 as its serving network.

Meanwhile, in selecting either the VPLMN A or the VPLMN B, the UE 101 selects the VPLMN by considering roaming agreement, a received signal strength at the UE 101 from the network, an access network, and so on. That is, in the VPLMN selection, the UE 101 does not consider the network slice.

Hence, even if there exists a PLMN for providing the network slice service to the UE 101 in the corresponding area or region #1, the UE 101 does not select the PLMN for providing the network slice in the PLMN selection and accordingly the network slice service may not be provided to the UE 101.

For example, the UE 101 roams from the HPLMN to the area #1 including the VPLMN A and the VPLMN B. Without considering the network slice, the UE 101 may select the VPLMN A as its serving network in consideration of the roaming agreement, the received signal strength and the access network. However, if the VPLMN A provides no network slice service required by the UE 101, the VPLMN A is selected as the serving network to thus provide no network slice or network slice related service in the corresponding area, despite the VPLMN (e.g., the VPLMN B) for providing the network slice or the network slice related service in the corresponding area.

The disclosure provides a solution for addressing the above problem.

Figure 2:
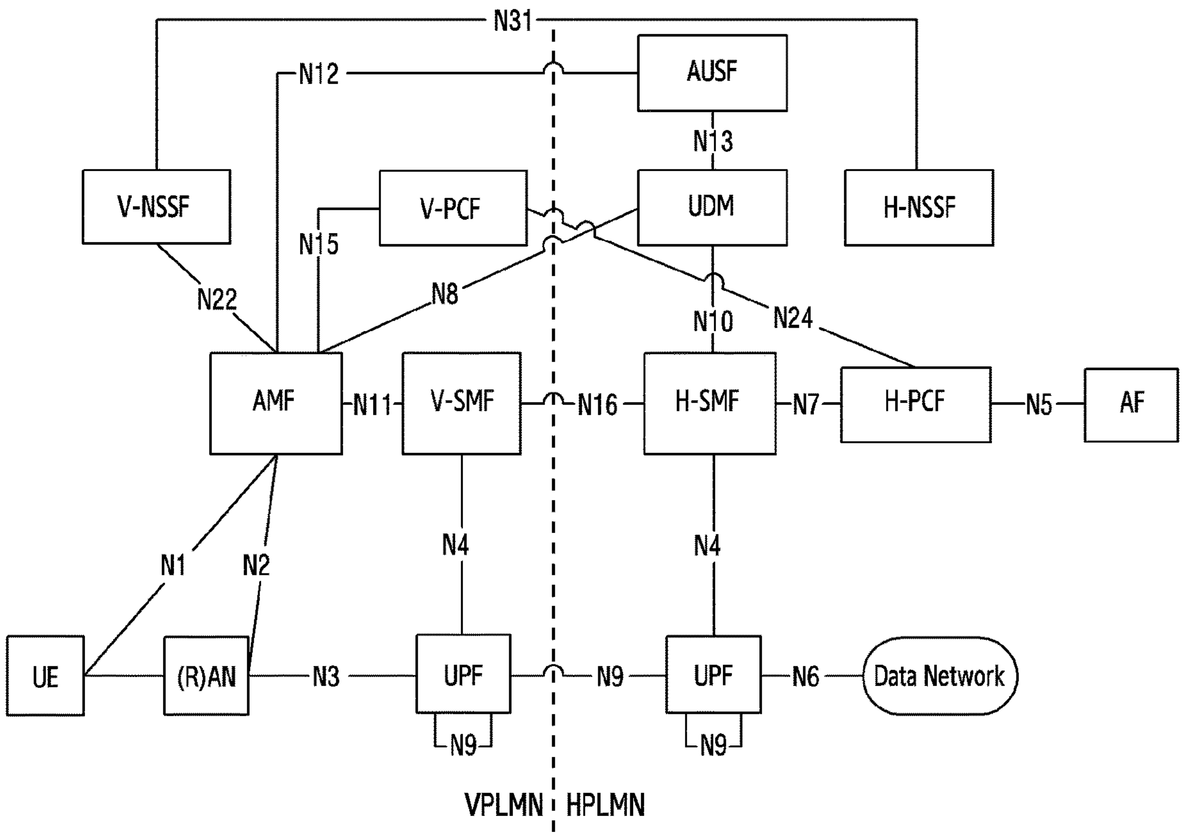
FIG. 2 illustrates a roaming procedure in relation to an embodiment of the disclosure.

FIG. 2 is a diagram illustrating a roaming procedure in relation to an embodiment of the disclosure.

Roaming may indicate that other PLMN than the HPLMN or an equivalent PLMN (EPLMN) services the UE according to UE movement. Such a PLMN supporting the roaming UE may be referred to as the VPLMN.

Hereafter, the roaming is described in detail. A UE moving into a specific area transmits a message requesting protocol data unit (PDU) session establishment to the AMF 111-2 or 111-3 of the VPLMN. The AMF 111-2 or 111-3 selects the SMF 121-2 or 121-3 to support the UE in the VPLMN, transmits the message requesting the PDU session establishment to the selected SMF 121-2 or 121-3 and receive a response message from the SMF 121-2 or 121-3. The SMF 121-2 or 121-3 selects the UPF 131-2 or 131-3 for supporting the UE in the VPLMN, transmits a message requesting an N4 session establishment to the selected UPF 131-2 or 131-3 and receive a response message from the UPF 131-2 or 131-3. Next, the SMF 121-2 or 121-3 of the VPLMN transmits the message requesting the PDU session establishment with the SMF 121 of the HPLMN, and the SMF 121 of the HPLMN performs a procedure for establishing an N4 session with the UDM 151, the PCF 161, and the UPF 131 of the HPLMN. The SMF 121 of the HPLMN transmits a PDU session establishment response message to the SMF 121-2 or 121-3 of the VPLMN, and transmits parameters and information related to the PDU session to the AMF 111-2 or 111-3 of the VPLMN. The AMF 111-2 or 111-3 of the VPLMN transmits a N2 PDU session request message to the 5G RAN 103-2 or 103-3, and the 5G RAN 103-2 or 103-3 establishing a radio resource control (RRC) connection with the UE transmits an N2 PDU session response message to the AMF 111-2 or 111-3. According to the series of the processes, the VPLMN may provide the service to the roaming UE.

Figure 3:
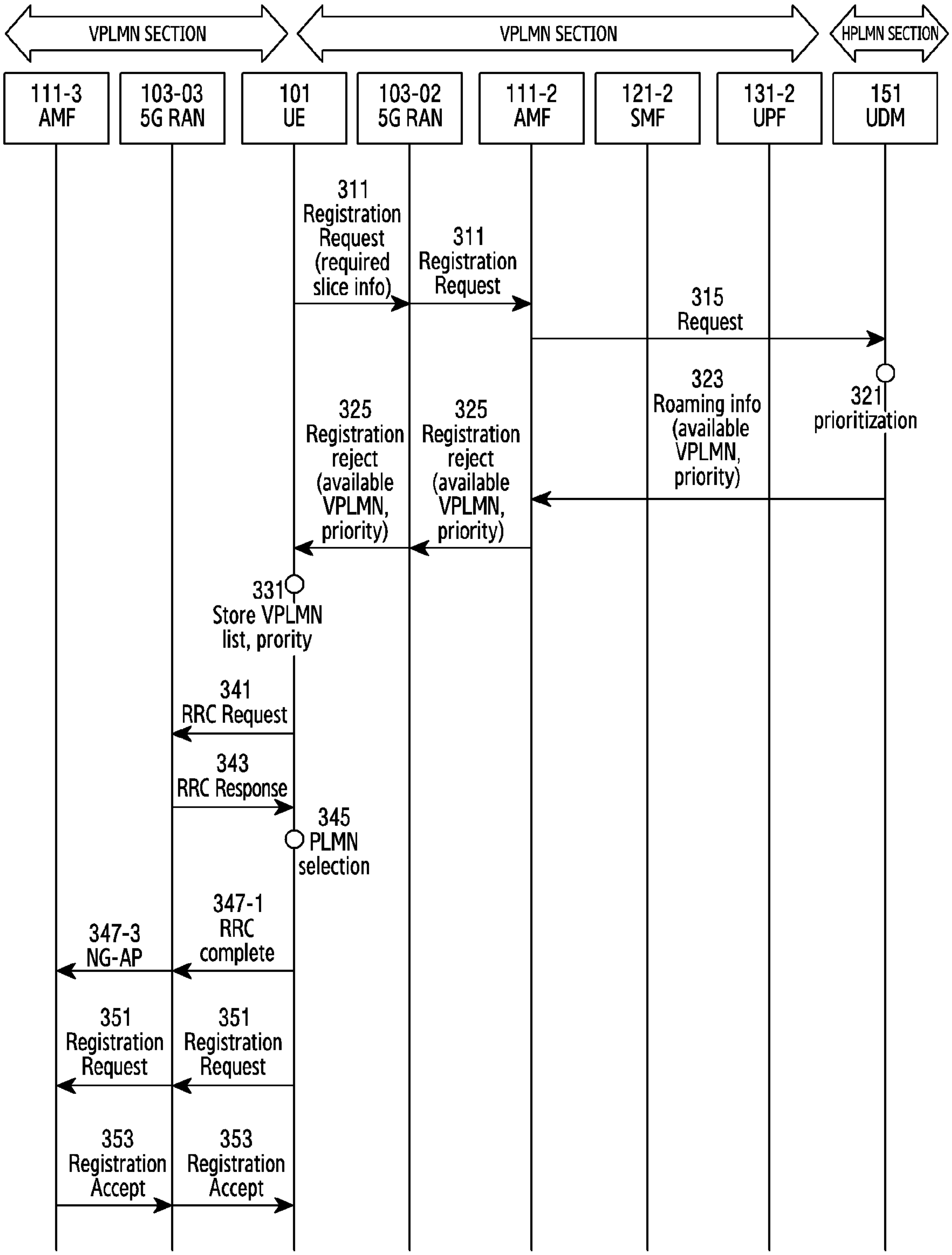
FIG. 3 illustrates a procedure for providing a network slice and/or a service to a moving or roaming terminal, in relation to an embodiment of the disclosure.

FIG. 3 is a diagram illustrating a procedure for providing a network slice and/or a service using a slice to a moving or roaming terminal, in relation to an embodiment of the disclosure.

Technical points are now described in FIG. 3.

Point 3-1) In FIG. 3, if the network provides accessible VPLMN information to the UE 101, the network gives a VPLMN slice priority to at least one VPLMN based on preferred network slice information of the UE 101. Hence, the UE 101 may select the VPLMN based on the VPLMN slice priority.

Point 3-2) According to the method of providing VPLMN slice prioritization, the UE 101 may request access to the network by including information about network slice resources or about network slice needed for a service, application, or to execute an application.

If the VPLMN (the VPLMN A in FIG. 3) initially accessed by the UE 101 determines that the UE 101 does not access the network slice via the VPLMN A, the VPLMN (i.e., the VPLMN A) selected by the UE 101 requests VPLMN information (e.g., a VPLMN list, VPLMN supporting slice information) and VPLMN slice priority information from the HPLMN based on the slice information requested by the UE 101.

Next, the HPLMN transmits a registration reject message or a registration accept message to the VPLMN (i.e., the VPLMN A), and transmits accessible VPLMN information (e.g., VPLMN list, slice information) for the UE 101, slice related information, and VPLMN slice priority information.

The VPLMN A forwards the VPLMN information (the VPLMN list, the slice information), the slice related information, and the VPLMN slice priority information received from the HPLMN, to the UE 101, and the UE 101 stores the received information.

Point 3-3) Based on the received information, the UE 101 selects the VPLMN (the VPLMN B in FIG. 2) for providing the network slice service requested by the UE 101, in the VPLMN list based on the slice priority, and transmits a registration request message for the access to the corresponding VPLMN (e.g., the VPLMN B).

Now, the aforementioned points shall be described as detailed operations of the UE and the network entities with reference to FIG. 3.

The UE 101 transmits a registration request message to the AMF 111-2 of the VPLMN A in operation 311.

The registration request message may include the service information required by the UE, and/or the network slice resource and network slice information required for the application or the application execution.

The AMF 111-2 of the VPLMN A transmits a message requesting information of the UE 101 to the UDM 151 of the HPLMN in operation 315. According to an embodiment, the AMF 111-2 of the VPLMN A may transmit the information request message to the PCF of the HPLMN. The information requested by the AMF 111-2 may include at least one of VPLMN information for providing the corresponding network slice based on the network slice information required by the UE 101, VPLMN list information providing the corresponding network slice, and VPLMN priority information according to the network slice provision in the VPLMN list.

Operation 315 may be understood as a process in which the selected VPLMN (the VPLMN A in FIG. 3) first selected by the UE 101 requests the VPLMN information (e.g., VPLMN list, slice information) and the VPLMN slice priority information from the HPLMN based on the slice information requested by the UE 101.

The UDM 151 of the HPLMN prioritizes the VPLMNs by considering the requested slice information received by the UE from the VPLMN A in operation 321. That is, the UDM 151 prioritizes available VPLMNs for the UE 101, by considering whether each VPLMN supports the slice required by the UE 101, resource information for supporting the slice, and so on. This procedure may be performed on one or more VPLMN connected to the UDM 151.

As mentioned above, if the entity receiving the information request message is the PCF rather than the UDM 151, the PCF may perform the prioritization. For example, the AMF 111-2 may transmit the information request message to the PCF, and the PCF may prioritize the VPLMN by considering the slice information of the UE 101. That is, the PCF prioritizes the available VPLMNs for the UE 101, by considering whether the slice required by the UE 101 is supported, the resource information for supporting the slice, and so on.

Operation 321 of FIG. 3 is to give the VPLMN slice priority for each VPLMN based on the preferred network slice information of the UE 101 and to select the VPLMN based on the VPLMN slice priority, if the network provides the UE 101 with the accessible VPLMN information of the UE 101.

Next, the UDM 151 (or the PCF) of the HPLMN transmits a registration reject message or a registration accept message to the VPLMN A, and includes at least one of the available VPLMN information (VPLMN list, slice information) for the UE 101, and the VPLMN slice priority information into the message in operation 323. The message including the information may be forwarded from the VPLMN A to the UE 101 in operation 325.

In operation 323, the UDM 151 or the PCF transmits roaming related information to the AMF 111-2 of the VPLMN A. The roaming related information may include at least one of available slice information for the UE, available VPLMN information for providing the corresponding slice or service, and the VPLMN priority information based on the slice information.

The AMF 111-2 of the VPLMN A transmits a registration reject message to the UE 101 in operation 325. The registration reject message includes the roaming related information. The roaming related information may include at least one of the available slice information for the UE, the available VPLMN information for providing the corresponding slice or service, and the VPLMN priority information based on the slice information.

In this embodiment, the serving PLMN (the PLMN A in FIG. 3) accessed by the UE 101 may not provide the network slice related service required by the UE 101.

According to another embodiment, the AMF 111-2 of the VPLMN A transmits a registration reject message to the UE 101. The registration reject message includes the roaming related information. The roaming related information may include at least one of the available slice information for the UE, the available VPLMN information for providing the corresponding slice or service, and the VPLMN priority information based on the slice information.

In this embodiment, the serving PLMN (the PLMN A in FIG. 3) accessed by the UE 101 notifies the UE 101 of the VPLMN information which provides the network slice related service required by the UE 101.

According to an embodiment, after the UE 101 attempts the registration procedure, the registration reject message or the registration accept message received by the UE 101 may include at least one of the following information.

A. available VPLMN/PLMN list for network slice service

B. priority information of PLMNs based on network slice provision

C. information indicating whether the network slice service is allowed/available in the corresponding PLMN (cause #zz)

D. priority indication based on network slice priority (the indication indicated by the network to the UE, wherein the indicator may be an indicator that instructs the UE to select a PLMN by applying an applicable priority based on the extent to which the network provides network slice services to the UE.)

The UE 101 receiving the registration reject message or the registration accept message including the above information may perform the following operations.

1) The UE 101 adds the PLMN corresponding to the received information to the available PLMN list, and stores it in a subscriber identity module (SIM), a non-volatile memory or a volatile memory.

2) The UE 101 attempts an access with the stored available PLMN list. The UE 101 may attempt to access the available PLMN based on the priority using the priority information given by the network slice service provision.

3) Next, if the UE 101 fails in the registration procedure with respect to the PLMN stored in the "available PLMN list", the corresponding PLMN is deleted from the available PLMN list.

4) The available PLMN list may be stored in the UE 101 until the UE 101 is switched off or the SIM is removed. Alternatively, the list may be deleted if the UE 101 is switched off or the SIM is deleted.

According to yet another embodiment, after the UE 101 attempts the registration procedure, if the registration reject message or the registration accept message received by the UE 101 includes "PLMN not allowed" (cause #xx) as a result of accessing a specific PLMN, the following operations may be conducted.

1) The UE 101 adds the corresponding VPLMN/VPLMN to a forbidden PLMN list, and stores in the SIM, the non-volatile memory or the volatile memory.

2) The UE 101 does not attempt an access with the stored forbidden PLMN list.

3) Next, if the UE 101 succeeds in the registration procedure with respect to a PLMN stored in the "forbidden PLMN list", the corresponding PLMN is deleted from the forbidden PLMN list.

4) The forbidden PLMN list may be stored in the UE 101 until the UE 101 is switched off or the SIM is removed. Alternatively, the list may be deleted if the UE 101 is switched off or the SIM is deleted.

According to still another embodiment, after the UE 101 attempts the registration, if the registration reject message or the registration accept message received by the UE 101 includes "network slice services not allowed in this PLMN" (cause #yy), the following operations may be conducted.

1) The PLMN is stored in the forbidden PLMN list for the network slice service.

2) The UE 101 does not access the corresponding PLMN.

3) If the registration procedure is successful, the corresponding PLMN is deleted from the forbidden list.

4) This list may be deleted if the UE 101 is switched off or the SIM is deleted.

The UE 101 stores the roaming related information from the VPLMN A in operation 331. The roaming related information may include at least one of the available slice information for the UE 101, the available VPLMN information for providing the corresponding slice or service, and the VPLMN priority information based on the slice information.

That is, the UE 101 stores at least one of the VPLMN information for providing the slice (VPLMN list, slice information), the slice related information, and the VPLMN slice priority information, which are received, in operation 331.

In operation 341, the UE 101 may transmit an RRC connection request message to a 5G RAN 103-03. At this time, the UE 101 which is idle may attempt an RRC connection with the 5G RAN 103-03, for a call attempt, data transmission attempt, or a response to a paging.

The UE 101 may receive an RRC connection setup message which is a response message, from the 5G RAN 103-03 in operation 343. For example, if the 5G RAN 103-03 accepts the connection request of the UE 101, the UE 101 may receive the RRC connection setup message from the 5G RAN 103-03.

In operation 345, the UE 101 may perform the following operations in relation to the PLMN selection. For example, the PLMN may be identified by a mobile country code (MCC) and a mobile network code (MNC).

PLMN information of a cell may be included in system information and broadcast.

If the UE 101 is initially switched on, the UE 101 may search for available PLMNs and select an appropriate PLMN for the service. The NAS layer of the UE 101 may notify the AS layer of the PLMN selection required. The AS layer may search the corresponding band, and notify the NAS layer of the PLMN list.

The NAS layer of the UE 101 may select a PLMN for registering the UE 101 according to the priority of the PLMN/RAT selection stored in a user services identity module (USIM).

The UE 101 may search for a suitable cell (or a normal cell) among the PLMN cells, and select a cell for providing its suitable service. In so doing, the suitable cell or the normal cell may indicate a cell for providing a normal service to the UE 101, and the corresponding cell is acceptable, needs to belong to the PLMN accessible by the corresponding UE 101, and is not barred from the registration procedure of the UE 101. If the corresponding cell is a closed access group cell (CAG) cell, the UE 101 may be a CAG member and the corresponding cell indicates the accessible cell of the UE 101.

For example, a cell on which the UE 101 receives a limited service is referred to as an acceptable cell. The UE 101 is not barred from camping on the acceptable cell, and the acceptable cell satisfies a cell selection criterion of the UE 101. That is, the acceptable cell may be a cell satisfying the signal strength or the signal quality. The limited service provides the UE 101 with an emergency call or an earthquake and tsunami warning system (ETWS) related service, which may be provided in the acceptable cell.

Now, in relation to operation 345 of FIG. 3, the PLMN selection of the UE 101 is described in further detail.

Case A) Automatic PLMN Selection

Case A-1) Priority Order of PLMN Selection

The following is the automatic PLMN selection, and the priority order applicable to the PLMN selection is as below. For example, the UE 101 may select the PLMN in the following order.

1) registered PLMN (RPLMN) or EPLMN. If the UE 101 succeeds in the HPLMN registration, the available PLMN information of the UE and the PLMN priority information considering the network slice may be included in the registration accept message or the registration reject message and transmitted from the AMF 111-3 to the UE 101.
2) user controlled PLMN and (radio) access technology
3) operator controlled PLMN and (radio) access technology
4) PLMN reported as high quality PLMN by AS layer Case A-2) Priority Order of PLMN Selection The following is the automatic PLMN selection, and the priority order applicable to the PLMN selection is as below. For example, the UE 101 may select the PLMN in the following order.

1) RPLMN or EPLMN
2) user controlled PLMN and (radio) access technology
3) operator controlled PLMN and (radio) access technology The operator controlled PLMN may indicate information provided from a communication provider to the UE 101 (hereafter, the operator controlled PLMN or an operator controlled PLMN list). The operator controlled PLMN may be PLMN information configured by the communication provider in the USIM.

According to an embodiment of the disclosure, the available PLMN information of the UE 101 and the priority information considering the network slice may be provided to the UE 101 through the operator controlled PLMN, and stored in the UE 101.

According to an embodiment, the operator controlled PLMN list may be pre-configured and stored in the USIM at the UE 101. The corresponding embodiment allows the UE 101 to select the PLMN in the operator controlled PLMN based on the PLMN selection priority.

According to an embodiment, the PLMN priority information considering the PLMN and the network slice may be included and transmitted in the registration accept message or the registration reject message. The UE 101 receiving the corresponding information may store it in the operator controlled PLMN.

4) PLMN Reported as High Quality PLMN by AS Layer

Case A-3) Priority Order of PLMN Selection

The following is the automatic PLMN selection, and the priority order applicable to the PLMN selection is as below. For example, the UE 101 may select the PLMN in the following order.

1) RPLMN or EPLMN
2) user controlled PLMN and (radio) access technology
3) operator controlled PLMN and (radio) access technology
4) PLMN reported as high quality PLMN by AS layer According to an embodiment, if the PLMNs reported by the AS layer as the high quality PLMNs (e.g., the PLMNs reported as the high quality PLMNs by satisfying at least one of the signal strength or the signal quality) include a PLMN having the provider agreement and allowed to access, the UE 101 may store the corresponding PLMN together with the priority information considering the network slice.

Case B) Manual PLMN Selection

In the manual PLMN selection, the user may directly select one PLMN from the PLMN list provided by the AS layer of the UE 101.

In an embodiment, if the UE 101 successfully finishes its location registration, the selected PLMN may become the RPLMN. The RPLMN may indicate the PLMN successfully finishing the location registration. Also, the EPLMN may be a PLMN serving as an equivalent of the RPLMN. The VPLMN may indicate a PLMN serving the UE 101 which is roaming.

The message transmitted in operation 347-1 may be an RRC message between the UE 101 and the 5G RAN 103-03. This RRC message may include (i.e., carry) and transmit a NAS message of operation 351.

In operation 347-1, the UE 101 may transmit an RRC connection setup complete message to the 5G RAN 103-03, and the UE 101 may enter an RRC connection mode. The RRC message (e.g., an RRC connection setup complete message) transmitted in operation 347-1 may carry (or contain) the registration request message which is a NAS message, the RRC message may include the registration request message which is a NAS message, or the RRC message may piggyback or concatenate the registration request message which is a NAS message.

In operation 347-3, the 5G RAN 103-03 transmits a next generation (NG)-application protocol (AP) message to an AMF 111-03. An NG-AP message section which is the 5G-RAN and AMF section includes and delivers the NAS message.

The NAS message of operation 351 may be transmitted from the UE 101 to the AMF 111-03 via the 5G RAN 103-03. For example, the UE 101 transmits the registration request message to the AMF 111-3 of the PLMN B which is another PLMN in operation 351.

That is, based on the roaming information received from the HPLMN via the VPLMN A and stored, the UE 101 changes the PLMN to receive the service in the VPLMN B, instead of receiving the slice service in the VPLMN A.

That is, the UE 101 selects the VPLMN B for providing the network slice service requested by the UE 101 in the VPLMN list based on the slice priority received from the VPLMN A which is the serving PLMN and transmits the registration request message to the VPLMN B in operation 351.

In operation 353, the UE 101 receives a registration accept message from the AMF 111-3 of the VPLMN B.

Figure 4:
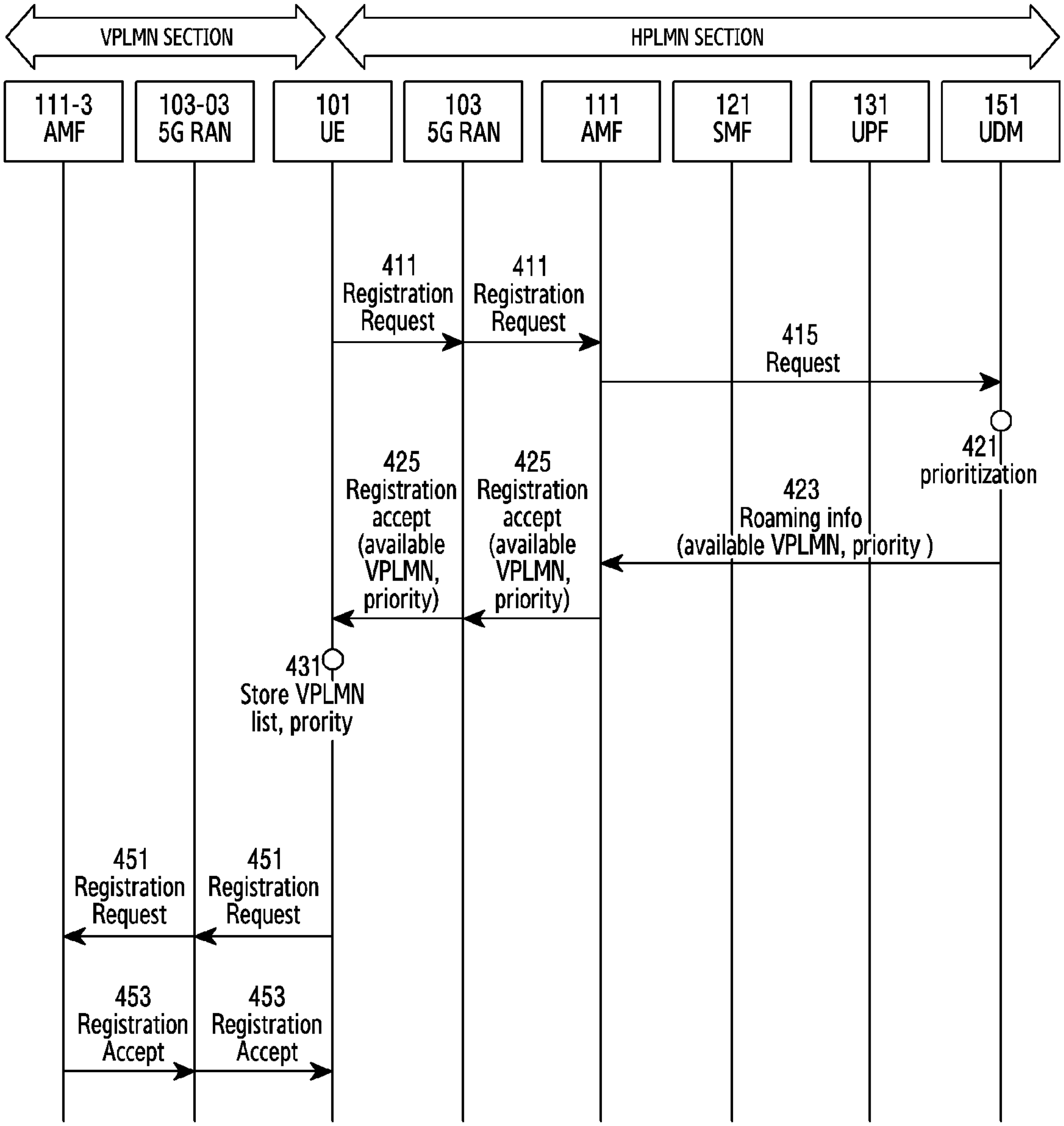
FIG. 4 illustrates a flowchart for a procedure for providing a network slice and/or a service to a moving or roaming terminal, in relation to an embodiment of the disclosure.

FIG. 4 is a flowchart illustrating a procedure for providing a network slice and/or a service using a slice to a moving or roaming terminal, in relation to an embodiment of the disclosure.

Technical points are now described in FIG. 4.

Point 4-1) In FIG. 4, if the network provides accessible VPLMN information to the UE 101, the network gives a VPLMN slice priority to at least one VPLMN based on preferred network slice information of the UE 101. Thus, the UE 101 may select the VPLMN based on the VPLMN slice priority.

Point 4-2) According to the VPLMN slice prioritization, if the UE 101 is connected to the HPLMN, the network of the HPLMN may transmit a registration accept message or a registration reject message to the UE 101, and include at least one of the accessible VPLMN information for the UE 101, a VPLMN network slice, and VPLMN slice priority information in the transmitted message.

Point 4-2-1-1) In relation to Point 4-2), the UE 101 may request from the HPLMN, a network slice resource and network slice information required for the service or an application or application execution.

Point 4-2-1-2) Alternatively, based on the slice information required by the UE 101, the UE 101 may request the HPLMN network to transmit at least one of VPLMN information (e.g., a VPLMN list, slice information) for providing the corresponding network slice for the roaming UE 101, and VPLMN slice priority information.

Point 4-2-1-3) Alternatively, the UE 101 may request from the HPLMN network at least one of the VPLMN information (e.g., a VPLMN list, slice information), and the VPLMN slice priority information.

Point 4-2-2) The HPLMN network transmits a registration reject message or a registration accept message to the UE 101. In so doing, the registration accept message or the registration reject message may include and transmit to the UE 101 at least one of the VPLMN information (the VPLMN list, the slice information) for providing the corresponding network slice based on the slice information requested by the UE 101, slice related information, and the VPLMN slice priority information.

Point 4-2-3) The UE 101 stores at least one of the VPLMN information (the VPLMN list, the slice information) for providing the slice, the slice related information, and the VPLMN slice priority information received from the HPLMN network.

Point 4-3) The UE 101 selects a VPLMN for providing the network slice service requested by the UE 101 in the VPLMN list based on the slice priority received from the HPLMN, transmits a registration request message to the selected VPLMN.

Now, the aforementioned points shall be described with detailed operations of the UE and the network entities with reference to FIG. 4.

The UE 101 transmits a registration request message to the AMF 111 of the HPLMN in operation 411.

With respect to the registration request message, the HPLMN network provides the accessible VPLMN information to the UE 101, and gives the VPLMN slice priority to the VPLMN based on the preferred network slice information of the UE 101, to allow the UE 101 to select the VPLMN according to the VPLMN slice priority.

In the VPLMN slice prioritization method according to an embodiment described in FIG. 4, if the UE 101 is connected to the HPLMN, the HPLMN network transmits the registration accept message or the registration reject message to the UE 101 and includes at least one of the available VPLMN information, the VPLMN network slice, and the VPLMN slice priority related information.

In operation 411, the UE 101 may transmit the registration request message to the AMF 111 of the HPLMN and request the following information (or parameters).

In operation 411, the UE 101 may request the network slice resource and the network slice required for the service, the application or the application execution from the HPLMN.

Alternatively, in operation 411, based on the slice information required by the UE 101, the UE 101 may request the HPLMN to transmit at least one of the VPLMN information (the VPLMN list, the slice information) for providing the corresponding network slice for the UE roaming, and the VPLMN slice priority information.

Alternatively, in operation 411, the UE 101 may request at least one of the VPLMN information (the VPLMN list, the slice information) and the VPLMN slice priority information from the HPLMN.

The AMF 111 of the HPLMN receiving the registration request message from the UE 101 transmits an information request message to the UDM 151 (or the PCF) in operation 415.

The UDM 151 receiving the information request message prioritizes the VPLMN by considering the slice in operation 421.

The UDM 151 (or the PCF) determining the priority transmits roaming related information to the AMF 111 in operation 423. The roaming related information may include at least one of the available slice information for the UE 101, available VPLMN information for providing the corresponding slice or service, and the VPLMN priority information based on the slice information.

The AMF 111 of the HPLMN transmits a registration accept message or a registration reject message to the UE 101 in operation 425. In so doing, the AMF 111 may transmit to the UE 101 the registration accept message or the registration reject message including at least one of the VPLMN information (e.g., VPLMN list, slice information) for providing the corresponding slice based on the slice information requested by the UE 101, the slice related information, and the VPLMN slice priority information.

According to an embodiment, the AMF 111 transmits a registration accept message to the UE 101. The registration accept message includes the roaming related information. The roaming related information may include at least one of the available slice information for the UE, the available VPLMN information for providing the corresponding slice or service, and the VPLMN priority information based on the slice information. In this embodiment, the HPLMN notifies the UE 101 of the VPLMN information for providing the network slice related service required by the UE 101.

According to another embodiment, the AMF 111 transmits a registration reject message to the UE 101. The registration reject message includes the roaming related information. The roaming related information may include at least one of the available slice information for the UE 101, the available VPLMN information for providing the corresponding slice or service, and the VPLMN priority information based on the slice information. In this embodiment, the PLMN accessed by the UE 101 as its serving PLMN may not provide the network slice related service required by the UE 101.

The UE 101 stores the roaming related information received from the HPLMN in operation 431. The roaming related information may include at least one of the available slice information for the UE, the available VPLMN information for providing the corresponding slice or service, and the VPLMN priority information based on the slice information.

That is, the UE 101 stores at least one of the VPLMN information for providing the slice (e.g., VPLMN list, slice information), the slice related information, and the VPLMN slice priority information, received from the HPLMN.

Next, the UE 101 transmits a registration request message to the AMF 111-3 of the VPLMN in operation 451. In this case, the UE 101 selects the VPLMN B as the PLMN for servicing the slice, according to the roaming related information received from the HPLMN and stored.

That is, the UE 101 selects the VPLMN (the VPLMN B of FIG. 4) for providing the network slice service requested by the UE 101 in the VPLMN list based on the slice priority received from the HPLMN, and transmits a registration request message to the selected VPLMN in operation 451.

In operation 453, the UE 101 receives a registration accept message from the AMF 111-3 of the VPLMN B.

Figure 5:
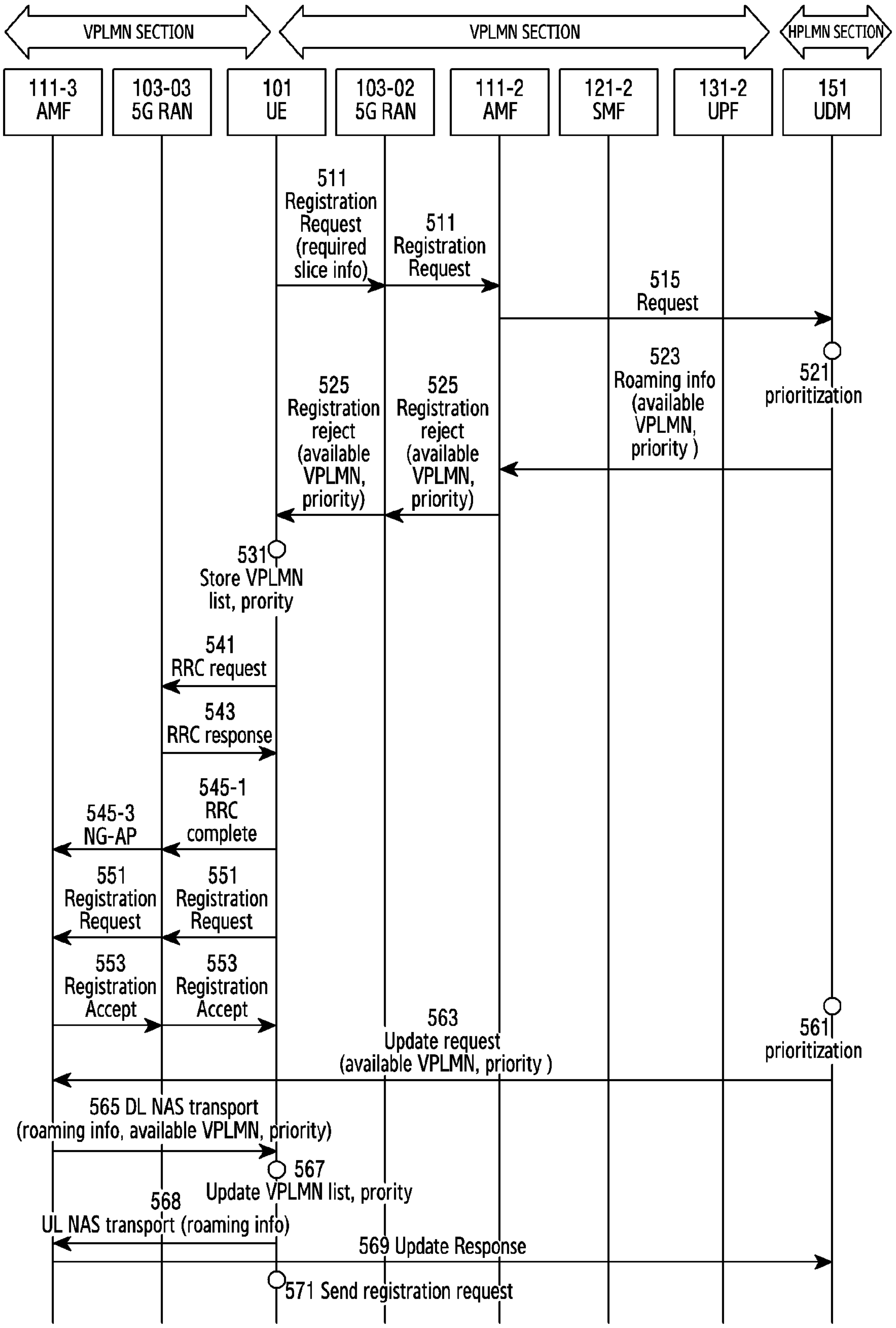
FIG. 5 illustrates a flowchart for a procedure for providing a network slice and/or a service to a moving or roaming terminal using a non-access stratum (NAS) message, in relation to an embodiment of the disclosure.

FIG. 5 is a flowchart illustrating a procedure for providing a network slice and/or a service using a slice to a moving or roaming terminal using a NAS message, in relation to an embodiment of the disclosure.

Technical points are now described in FIG. 5.

In the embodiment of FIG. 5, the network may provide available network slice information and available VPLMN information to the UE 101, if the preferred network slice information of the UE 101 is updated, or if the network slice information and the VPLMN slice priority information based on the network slice information is updated or changed based on subscription information of the UE 101. That is, to update or configure the above information for the UE 101, the network may provide the UE 101 with the network slice information or the accessible VPLMN information.

Point 5-1) In FIG. 5, in providing the accessible VPLMN information to the UE 101, the network gives a VPLMN slice priority to at least one VPLMN based on the preferred network slice information of the UE 101. Thus, the UE 101 may select the VPLMN based on the VPLMN slice priority.

Point 5-2) According to the method for updating the VPLMN slice priority at the network, the network may update at least one of the VPLMN network slice related information and the VPLMN network slice priority related information in the UE 101 using a downlink (DL) NAS transport message.

Point 5-2-1) The network entity (e.g., the UDM) of the HPLMN transmits a DL NAS transport message to the UE 101 via the AMF of the VPLMN.

This DL NAS transport message includes at least one of the VPLMN information (VPLMN list, slice information) for providing a slice to the UE 101, the slice related information, and the VPLMN slice priority.

Point 5-2-2-1) The UE receiving the DL NAS transport message via the VPLMN updates or stores at least one of the VPLMN information (the VPLMN list, the slice information) for providing the slice, the slice related information, and the VPLMN slice priority information, as new information.

Point 5-2-2-2) Alternatively, the UE receiving the DL NAS transport message via the VPLMN stores at least one of the received VPLMN information (the VPLMN list, the slice information) for providing the slice, the slice related information, and the VPLMN slice priority information, in addition to the existing information.

Point 5-2-2-3) Alternatively, the UE receiving the DL NAS transport message via the VPLMN stores at least one of the received VPLMN information (the VPLMN list, the slice information) for providing the slice, the slice related information, and the VPLMN slice priority information, by deleting the existing information.

Point 5-3) The UE receiving the DL NAS transport message via the VPLMN transmits an uplink (UL) NAS transport message to the AMF of the VPLMN, in response to receiving the information of the VPLMN network slice and the VPLM network slice priority.

Point 5-4) The UE selects the VPLMN for providing the network slice service requested by the UE from the received VPLMN list based on the slice priority, and transmits a registration request message to the selected VPLMN.

Now, the aforementioned points shall be described with detailed operations of the UE and the network entities with reference to FIG. 5.

The UE 101 transmits a registration request message to the AMF 111-2 of the serving VPLMN (the VPLMN A of FIG. 5) in operation 511. The UE 101 may request a network slice and a network slice required for the service, the application or the application execution, from the AFM 111-2 of the VPLMN A.

The AMF 111-2 of the VPLMN A transmits an information request message to the UDM 151 of the HPLMN in operation 515. Alternatively, the AMF 111-2 of the VPLMN A transmits an information request message to the PCF of the HPLMN. In so doing, the information requested by the AMF 111-2 may include at least one of VPLMN information for providing the corresponding network slice based on the network slice information required by the UE 101, VPLMN list information providing the corresponding network slice, and VPLMN priority information according to the network slice provision in the VPLMN list providing the corresponding network slice.

Operation 515 may be understood as a process in which the VPLMN (the VPLMN A in FIG. 5) first selected by the UE 101 requests the VPLMN information (e.g., VPLMN list, slice information) based on the slice information and the VPLMN slice priority information from the HPLMN.

The UDM 151 of the HPLMN prioritizes the VPLMN by considering the slice information received from the AMF 111-2 in operation 521. That is, the UDM 151 of the HPLMN prioritizes the available VPLMN for the UE 101, based on whether it supports the slice required by the UE 101, resource information for supporting the slice, and so on.

As mentioned above, the PCF, rather than the UDM 151, may perform the prioritization in the HPLMN. For example, if the AMF 111-2 transmits the information request message to the PCF, the PCF may prioritize the VPLMN by considering the slice information. That is, the PCF prioritizes the available VPLMN for the UE 101, based on whether it supports the slice required by the UE 101, the resource information for supporting the slice, and so on.

Operation 521 is to allow the UE 101 to give the VPLMN slice priority to the VPLMN based on the preferred network slice of the UE 101 and to select the VPLMN based on the VPLMN slice priority, if the network provides the UE 101 with the accessible VPLMN information.

Next, the HPLMN transmits a registration reject message or a registration accept message to the VPLMN (the VPLMN A of FIG. 5), and includes at least one of the available VPLMN information (the VPLMN list, the slice information), the slice related information, and the VPLMN slice priority information.

Specifically, the UDM 151 or the PCF of the HPLMN transmits roaming related information to the AMF 111-2 of the VPLMN A. The roaming related information may include at least one of the available slice information for the UE 101, available VPLMN information for providing the corresponding slice or service, and the VPLMN priority information based on the slice information.

Next, the AMF 111-2 transmits a registration reject message to the UE 101 in operation 525.

According to an embodiment, the AMF 111-2 transmits a registration reject message to the UE 101 in operation 525, and the registration reject message may include the roaming related information. The roaming related information may include at least one of available slice information for the UE 101, the available VPLMN information for providing the corresponding slice or service, and the VPLMN priority information based on the slice information.

In this embodiment, the serving PLMN (the PLMN A in FIG. 5) accessed by the UE 101 may not provide the network slice related service required by the UE 101.

According to another embodiment, the AMF 111-2 of the VPLMN A transmits a registration accept message to the UE 101 in operation 525. The registration accept message may include the roaming related information. The roaming related information may include at least one of the available slice information for the UE, the available VPLMN information for providing the corresponding slice or service, and the VPLMN priority information based on the slice information.

This embodiment may be applied if the network notifies the UE 101 of the VPLMN information for providing the network slice related service required by the UE 101.

The UE 101 stores the received roaming related information in operation 531. The roaming related information may include at least one of the available slice information for the UE 101, the available VPLMN information for providing the corresponding slice or service, and the VPLMN priority information based on the slice information, received at the UE 101 from the network.

The information stored at the UE 101 in operation 513 may include at least one of the VPLMN information (e.g., VPLMN list, slice information) for providing the slice, the slice related information, and the VPLMN slice priority information.

In operation 541, the UE 101 may transmit an RRC request message to the 5G RAN 103-03 of the new PLMN (the VPLMN B of FIG. 5).

In operation 543, the 5G RAN 103-03 transmits an RRC response message to the UE 101.

In operation 545-1, the UE 101 transmits an RRC complete message to the 5G RAN 103-03.

In operation 545-3, the 5G RAN 103-03 transmits an NG-AP message to the AMF 111-03.

In operation 551, the UE 101 transmits a registration request message to the AMF 111-03 of the VPLMN B.

In this case, based on the roaming related information received from the HPLMN via the VPLMN A and stored, the UE 101 selects the VPLMN B as the new PLMN (or the UE determines to change the PLMN from the VPLMN A to the VPLMN B) based on the VPLMN B which services its required slice.

In operation 551, the UE 101 selects the VPLMN for providing the network slice service requested by the UE 101 in the VPLMN list received from the VPLMN A and stored based on the slice priority, and transmits a registration request message to the selected VPLMN (the VPLMN B of FIG. 5).

In operation 553, the UE 101 receives a registration accept message from the AMF 111-3.

In operation 561, the UDM 151 or the PCF of the HPLMN prioritizes the accessible VPLMN list of the UE 101 based on the slice priority, or updates the existing priority. Updating is triggered by at least one of changing the priority required by the UE for the network slice, changing the network slice resource, or changing the priority if the network provides the network slice for each UE.

That is, the UDM 151 or the PCF of the HPLMN prioritizes the accessible VPLMN list of the UE 101 based on the slice required by the UE 101, based on whether to provide the slice, whether a resource remains for the slice, or a service first to be received by the UE 101 based on the subscription information.

In operation 563, the UDM 151 or the PCF of the HPLMN transmits an update request message to the AMF 111-3 of the serving PLMN (the VPLMN B of FIG. 5). The update request message may include at least one of the updated available VPLMN information, and the priority information based on the slice.

According to the method for updating the VPLMN slice priority, the HPLMN network may update the VPLMN network slice and VPLMN network slice priority information of the UE 101 using a DL NAS transport message.

For example, the HPLMN network (e.g., the UDM 151) transmits a DL NAS transport message to the UE 101 via the AMF 111-3 of the VPLMN in operations 563 and 565. The DL NAS transport message includes at least one of the VPLMN information (e.g., VPLMN list, slice information) for providing the slice, the slice related information, and the VPLMN slice priority information.

The UE 101 receiving the DL NAS transport message updates at least one of the VPLMN information (e.g., VPLMN list, slice information) for providing the slice, the slice related information, and the VPLMN slice priority information in operation 567.

According to an embodiment, the UE 101 updates or stores at least one of the VPLMN information (e.g., VPLMN list, slice information) for providing the slice, the slice related information, and the VPLMN slice priority information, as new information received.

Alternatively, the UE 101 stores at least one of the received VPLMN information (e.g., VPLMN list, slice information) for providing the slice, the slice related information, and the VPLMN slice priority information, in addition to the existing information.

Alternatively, the UE 101 stores at least one of the received VPLMN information (e.g., VPLMN list, slice information) for providing the slice, the slice related information, and the VPLMN slice priority information, as new received information, by deleting the existing information.

In operation 568, the UE 101 transmits a UL NAS transport message to the AMF 111-3, in response to receiving and storing the VPLMN network slice information and the VPLM network slice priority information.

The AMF 111-3 receiving the UL NAS message from the UE 101 transmits an update response message to the UDM 151 of the HPLMN in operation 569.

Next, the UE selects the VPLMN for providing the network slice service requested by the UE in the received VPLMN list based on the slice priority, and transmits a registration request message to the selected VPLMN in operation 571.

Figure 6:
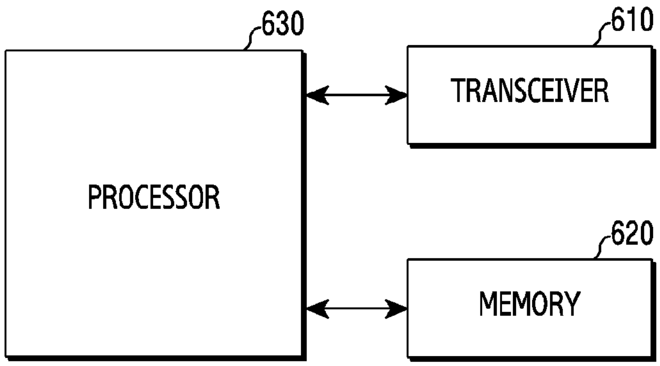
FIG. 6 illustrates a configuration of a terminal according to an embodiment of the disclosure.

FIG. 6 is a diagram illustrating a configuration of a terminal according to an embodiment of the disclosure.

As shown in FIG. 6, the terminal of the disclosure may include a transceiver 610, a memory 620, and a processor (or a controller) 630. The processor 630, the transceiver 610 and the memory 620 of the terminal may operate according to a communication method of the terminal. However, the components of the terminal are not limited to the above example. For example, the terminal may include more or less components than the above components. In addition, the processor 630, the transceiver 610 and the memory 620 may be implemented as a single chip.

The transceiver 610 collectively indicates a receiver of the terminal and a transmitter of the terminal, and may transmit and receive signals to and from a base station or a network entity. The signal transmitted and received to and from the base station may include control information and data. For doing so, the transceiver 610 may include a radio frequency (RF) transmitter for up-converting and amplifying a frequency of a transmit signal, an RF receiver for low-noise-amplifying and down-converting a received signal, and so on. However, this is merely an embodiment of the transceiver 610, and the components of the transceiver 610 are not limited to the RF transmitter and the RF receiver.

The transceiver 610 may include a wired and wireless transceiver, and may include various configurations for transmitting and receiving signals. In addition, the transceiver 610 may receive a signal over a wireless channel, output the signal to the processor 630, and transmit a signal outputted from the processor 630 over the wireless channel. Further, the transceiver 610 may receive and output a communication signal to the processor 630, and transmit a signal outputted from the processor 630 to a network entity over a wired and wireless network.

The memory 620 may store a program and data necessary for the operation of the terminal. The memory 620 may store control information or data included in the signal obtained at the terminal. The memory 620 may include storage media such as a read only memory (ROM), a random access memory (RAM), a hard disk, a compact disk (CD)-ROM, and a digital versatile disk (DVD), or a combination of the storage media.

The processor (or the controller) 630 may control a series of processes performed by the terminal according to an embodiment of the disclosure. The processor (or the controller) 630 may include one or more processors. For example, the processor (or the controller) 630 may include a communication processor (CP) for controlling the communication and an application processor (AP) for controlling a higher layer such as an application program.

Figure 7:
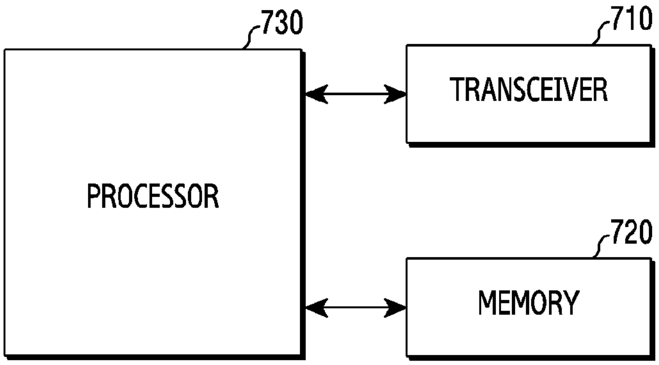
FIG. 7 illustrates a configuration of a network entity according to an embodiment of the disclosure.

FIG. 7 is a diagram illustrating a configuration of a network entity according to an embodiment of the disclosure. The network entity in FIG. 7 may indicate a plurality of NFs or network entities which build a core network.

As shown in FIG. 7, the network entity of the disclosure may include a transceiver 710, a memory 720, and a processor (or a controller) 730. The processor 730, the transceiver 710 and the memory 720 of the network entity may operate according to a communication method of the network entity. However, the components of the network entity are not limited to the above example. For example, the network entity may include more or less components than the above components. In addition, the processor 730, the transceiver 710 and the memory 720 may be implemented as a single chip. The network entity may include the aforementioned NFs such as the AMF, the SMF, the PCF, the NEF, the UDM, and the UPF.

The transceiver 710 collectively indicates a receiver of the network entity and a transmitter of the network entity, and may transmit and receive signals to and from a terminal or another network entity. The signal transmitted and received may include control information and data. For doing so, the transceiver 710 may include an RF transmitter for up-converting and amplifying a frequency of a transmit signal, an RF receiver for low-noise-amplifying and down-converting a received signal, and so on. However, this is merely an embodiment of the transceiver 710, and the components of the transceiver 710 are not limited to the RF transmitter and the RF receiver. The transceiver 710 may include a wired and wireless transceiver, and may include various configurations for transmitting and receiving signals.

In addition, the transceiver 710 may receive a signal over a communication channel (e.g., a radio channel), output the signal to the processor 730, and transmit a signal outputted from the processor 730 over the communication channel. Further, the transceiver 710 may receive and output a communication signal to the processor 730, and transmit a signal outputted from the processor 730 to the terminal or the network entity over a wired and wireless network.

The memory 720 may store a program and data necessary for the operation of the network entity. The memory 720 may store control information or data included in the signal obtained at the network entity. The memory 720 may include storage media such as a ROM, a RAM, a hard disk, a CD-ROM, and a DVD, or a combination of the storage media.

The processor (or the controller) 730 may control a series of processes to operate the network entity according to an embodiment of the disclosure. The processor (or the controller) 730 may include one or more processors. Methods according to embodiments disclosed in the claims or the specification of the disclosure may be implemented in hardware, in software, or in a combination of hardware and software.

Figure 8:
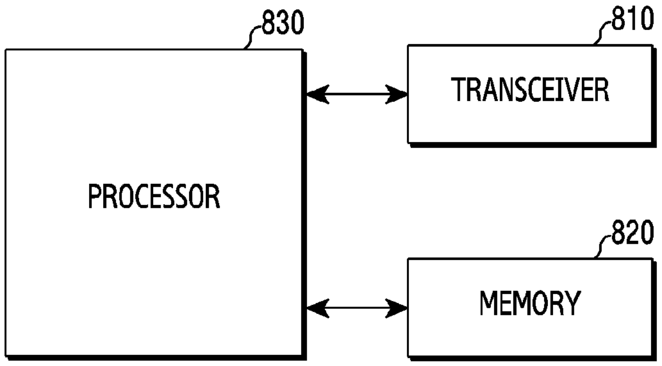
FIG. 8 illustrates a configuration of a base station according to an embodiment of the disclosure.

FIG. 8 is a diagram illustrating a configuration of a base station according to an embodiment of the disclosure. As shown in FIG. 8, the base station of the disclosure may include a transceiver 810, a memory 820, and a processor (or a controller) 830. The processor 830, the transceiver 810 and the memory 820 of the base station may operate according to a communication method of the base station. However, the components of the base station are not limited to the above example. For example, the base station may include more or less components than the above components. In addition, the processor 830, the transceiver 810 and the memory 820 may be implemented as a single chip.

The transceiver 810 collectively indicates a receiver of the base station and a transmitter of the base station, and may transmit and receive signals to and from a terminal or a network entity. The signal transmitted and received may include control information and data. For doing so, the transceiver 810 may include an RF transmitter for up-converting and amplifying a frequency of a transmit signal, an RF receiver for low-noise-amplifying and down-converting a received signal, and so on. However, this is merely an embodiment of the transceiver 810, and the components of the transceiver 810 are not limited to the RF transmitter and the RF receiver. The transceiver 810 may include a wired and wireless transceiver, and may include various configurations for transmitting and receiving signals.

In addition, the transceiver 810 may receive a signal over a communication channel (e.g., a radio channel), output the signal to the processor 830, and transmit a signal outputted from the processor 830 over the communication channel. Further, the transceiver 810 may receive and output a communication signal to the processor 830, and transmit a signal outputted from the processor 830 to the terminal or the network entity over a wired and wireless network.

The memory 820 may store a program and data necessary for the operation of the base station. The memory 820 may store control information or data included in the signal obtained at the base station. The memory 820 may include storage media such as a ROM, a RAM, a hard disk, a CD-ROM, and a DVD, or a combination of the storage media.

The processor 830 may control a series of processes to operate the base station according to an embodiment of the disclosure. The processor 830 may include one or more processors. Methods according to embodiments disclosed in the claims or the specification of the disclosure may be implemented in hardware, in software, or in a combination of hardware and software.

In the software implementation, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the disclosure.

Such a program (software module, software) may be stored to a random access memory, a non-volatile memory including a flash memory, a ROM, an electrically erasable programmable ROM (EEPROM), a magnetic disc storage device, a CD-ROM, DVDs or other optical storage devices, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the disclosure through an external port. In addition, a separate storage device on the communication network may access the device which executes an embodiment of the disclosure.

In the specific embodiments of the disclosure, the components included in the disclosure are expressed in a singular or plural form. However, the singular or plural expression is appropriately selected according to a proposed situation for the convenience of explanation, the disclosure is not limited to a single component or a plurality of components, the components expressed in the plural form may be configured as a single component, and the components expressed in the singular form may be configured as a plurality of components.

Meanwhile, although the detailed embodiments have been described in the detailed description of the disclosure, the disclosure may be modified in various ways without departing from the scope of the disclosure. Accordingly, the scope of the disclosure should not be limited to the aforementioned embodiments, but should be defined by not only the claims but equivalents thereof.

Further, it is noted that some or all of the embodiments disclosed herein may be performed in combination with some or all of other embodiments, and such combinations fall within the scope of the disclosure.

What is claimed is:

1. A method performed by a user equipment (UE) in a wireless communication system, the method comprising:

transmitting, to a first access and mobility management function (AMF) entity of a first visited public land mobile network (VPLMN), a first registration request message including information on a network slice for a service;

receiving, from the first AMF entity of the first VPLMN, a registration reject message including information on an available network slice, information on an available VPLMN for the available network slice and information on a priority of the available VPLMN, wherein the information on the priority of the available VPLMN includes a priority indicator instructing a VPLMN selection for the UE based on an extent to which the available VPLMN provides the service to the UE;

storing the information on the available network slice, the information on the available VPLMN for the available network slice, and the information on the priority of the available VPLMN included in the registration reject message in an operator controlled PLMN list, wherein the operator controlled PLMN list includes pre-configured information stored in the UE;

selecting a second VPLMN based on a pre-determined order of a registered PLMN (RPLMN), an equivalent PLMN (EPLMN), user controlled PLMN, the operator controlled PLMN list, and at least one PLMN reported as high quality PLMN;

transmitting, to a second AMF entity of the selected second VPLMN, a second registration request message, wherein the second VPLMN is determined based on the information on the available VPLMN for the available network slice and the information on the priority of the available VPLMN included in the registration reject message in case that the operator controlled PLMN list is selected according to the pre-determined order; and receiving, from the second AMF entity of the second VPLMN, a registration accept message as a response to the second registration request message.

2. The method of claim 1, wherein the information on the available VPLMN for the available network slice and the information on the priority of the available VPLMN are obtained from a user data management (UDM) entity or a policy control function (PCF) entity of a home public land mobile network (HPLMN).

3. The method of claim 2, wherein the available VPLMN includes one or more VPLMNs which are prioritized by the UDM entity or the PCF entity of the HPLMN.

4. The method of claim 1, wherein the available VPLMN includes one or more VPLMNs, and the second VPLMN is selected from the available VPLMN based on the priority of the available VPLMN.

5. The method of claim 1, wherein the registration reject message further includes first cause information indicating that the first VPLMN is not allowed for the service or second cause information indicating that the network slice for the service is not allowed for the first VPLMN.

6. A method performed by a first access and mobility management function (AMF) entity of a first visited public land mobile network (VPLMN) in a wireless communication system, the method comprising:

receiving, from a user equipment (UE), a first registration request message including information on a network slice for a service; and transmitting, to the UE, a registration reject message including information on an available network slice, information on an available VPLMN for the available network slice and information on a priority of the available VPLMN, wherein the information on the priority of the available VPLMN includes a priority indicator instructing a VPLMN selection for the UE based on an extent to which the available VPLMN provides the service to the UE, wherein a second registration request message is transmitted to a second AMF entity of a second VPLMN which is based on a pre-determined order of a registered PLMN (RPLMN), an equivalent PLMN (EPLMN), user controlled PLMN, and an operator controlled PLMN list, wherein the operator controlled PLMN list stores the information on the available VPLMN for the available network slice and the information on the priority of the available VPLMN included in the registration reject message.

7. The method of claim 6, further comprising:

receiving, from a user data management (UDM) entity or a policy control function (PCF) entity of a home public land mobile network (HPLMN), the information on the available VPLMN for the available network slice and the information on the priority of the available VPLMN.

8. The method of claim 7, wherein the available VPLMN includes one or more VPLMNs which are prioritized by the UDM entity or the PCF entity of the HPLMN.

9. The method of claim 6, wherein the available VPLMN includes one or more VPLMNs, and the second VPLMN is selected from the available VPLMN based on the priority of the available VPLMN.

10. The method of claim 6, wherein the registration reject message further includes first cause information indicating that the first VPLMN is not allowed for the service or second cause information indicating that the network slice for the service is not allowed for the first VPLMN.

11. A user equipment (UE) in a wireless communication system, the UE comprising:

at least one transceiver;

at least one processor communicatively coupled to the at least one transceiver; and at least one memory, communicatively coupled to the at least one processor, storing instructions executable by the at least one processor individually or in any combination to cause the UE to:

transmit, to a first access and mobility management function (AMF) entity of a first visited public land mobile network (VPLMN), a first registration request message including information on a network slice for a service, receive, from the first AMF entity of the first VPLMN, a registration reject message including information on an available network slice, information on an available VPLMN for the available network slice and information on a priority of the available VPLMN, wherein the information on the priority of the available VPLMN includes a priority indicator instructing a VPLMN selection for the UE based on an extent to which the available VPLMN provides the service to the UE, store the information on the available network slice, the information on the available VPLMN for the available network slice, and the information on the priority of the available VPLMN included in the registration reject message in an operator controlled PLMN list, wherein the operator controlled PLMN list includes pre-configured information stored in the UE, select a second VPLMN based on a pre-determined order of a registered PLMN (RPLMN), an equivalent PLMN (EPLMN), user controlled PLMN, the operator controlled PLMN list, and at least one PLMN reported as high quality PLMN, transmit, to a second AMF entity of the selected second VPLMN, a second registration request message, wherein the second VPLMN is determined based on the information on the available VPLMN for the available network slice and the information on the priority of the available VPLMN included in the registration reject message in case that the operator controlled PLMN list is selected according to the pre-determined order, and receive, from the second AMF entity of the second VPLMN, a registration accept message as a response to the second registration request message.

12. The UE of claim 11, wherein the information on the available VPLMN for the available network slice and the information on the priority of the available VPLMN are obtained from a user data management (UDM) entity or a policy control function (PCF) entity of a home public land mobile network (HPLMN).

13. The UE of claim 12, wherein the available VPLMN includes one or more VPLMNs which are prioritized by the UDM entity or the PCF entity of the HPLMN.

14. The UE of claim 11, wherein the available VPLMN includes one or more VPLMNs, and the second VPLMN is selected from the available VPLMN based on the priority of the available VPLMN.

15. The UE of claim 11, wherein the registration reject message further includes first cause information indicating that the first VPLMN is not allowed for the service or second cause information indicating that the network slice for the service is not allowed for the first VPLMN.

16. A first access and mobility management function (AMF) entity of a first visited public land mobile network (VPLMN) in a wireless communication system, the first AMF entity comprising:

at least one processor; and at least one memory, communicatively coupled to the at least one processor, storing instructions executable by the at least one processor individually or in any combination to cause the first AMF entity to:

receive, from a user equipment (UE), a first registration request message including information on a network slice for a service, and transmit, to the UE, a registration reject message including information on an available network slice, information on an available VPLMN for the available network slice and information on a priority of the available VPLMN, wherein the information on the priority of the available VPLMN includes a priority indicator instructing a VPLMN selection for the UE based on an extent to which the available VPLMN provides the service to the UE, wherein a second registration request message is transmitted to a second AMF entity of a second VPLMN which is based on a pre-determined order of a registered PLMN (RPLMN), an equivalent PLMN (EPLMN), user controlled PLMN, and an operator controlled PLMN list, wherein the operator controlled PLMN list stores the information on the available VPLMN for the available network slice and the information on the priority of the available VPLMN included in the registration reject message.

17. The first AMF entity of claim 16, wherein the instructions further cause the first AMF entity to:

receive, from a user data management (UDM) entity or a policy control function (PCF) entity of a home public land mobile network (HPLMN), the information on the available VPLMN for the available network slice and the information on the priority of the available VPLMN.

18. The first AMF entity of claim 17, wherein the available VPLMN includes one or more VPLMNs which are prioritized by the UDM entity or the PCF entity of the HPLMN.

19. The first AMF entity of claim 16, wherein the available VPLMN includes one or more VPLMNs, and the second VPLMN is selected from the available VPLMN based on the priority of the available VPLMN.

20. The first AMF entity of claim 16, wherein the registration reject message further includes first cause information indicating that the first VPLMN is not allowed for the service or second cause information indicating that the network slice for the service is not allowed for the first VPLMN.

* * * * *